(12) United States Patent
Bennett

(10) Patent No.: US 6,843,750 B1
(45) Date of Patent: Jan. 18, 2005

(54) TWO-SPEED GEARBOX WITH INTEGRATED DIFFERENTIAL

(75) Inventor: John L. Bennett, Fraser, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/630,417

(22) Filed: Jul. 30, 2003

(51) Int. Cl.[7] .............................................. F16H 3/44
(52) U.S. Cl. ...................................... 475/273; 475/310
(58) Field of Search ................................. 475/273, 310, 475/309

(56) References Cited

U.S. PATENT DOCUMENTS

| | | | | |
|---|---|---|---|---|
| 1,537,802 | A | * | 5/1925 | Collins ........................ 475/268 |
| 2,997,898 | A | * | 8/1961 | Ellis ............................ 475/139 |
| 3,511,112 | A | * | 5/1970 | Ellis et al. ................... 475/145 |
| 4,588,040 | A | | 5/1986 | Albright, Jr. et al. |
| 5,100,368 | A | | 3/1992 | Chien |
| 5,201,691 | A | | 4/1993 | Doyle |
| 5,558,589 | A | | 9/1996 | Schmidt |
| 5,827,148 | A | | 10/1998 | Seto et al. |
| 5,951,424 | A | | 9/1999 | Briceland |
| 6,041,877 | A | | 3/2000 | Yamada et al. |
| 6,053,833 | A | | 4/2000 | Masaki |
| 6,083,138 | A | | 7/2000 | Aoyama et al. |
| 6,083,139 | A | | 7/2000 | Deguchi et al. |
| 6,090,005 | A | | 7/2000 | Schmidt et al. |
| 6,098,733 | A | | 8/2000 | Ibaraki et al. |
| 6,110,066 | A | | 8/2000 | Nedungadi et al. |
| 6,170,587 | B1 | | 1/2001 | Bullock |
| 6,358,176 | B1 | | 3/2002 | Nauheimer et al. |
| 6,371,878 | B1 | | 4/2002 | Bowen |
| 6,378,638 | B1 | | 4/2002 | Mizon et al. |
| 6,398,685 | B1 | | 6/2002 | Wachauer et al. |
| 6,401,850 | B1 | | 6/2002 | Bowen |
| 6,481,519 | B1 | | 11/2002 | Bowen |
| 6,499,549 | B2 | | 12/2002 | Mizon et al. |

OTHER PUBLICATIONS

Hybrid Diesel–Electric Engines, http://www.g2mil.com/hybrid.htm.

* cited by examiner

*Primary Examiner*—Dirk Wright
(74) *Attorney, Agent, or Firm*—Carlson, Gaskey & Olds

(57) ABSTRACT

A gearbox assembly includes a housing which contains a differential gear set and a two-speed reduction gear set. A spider drives differential pinion gears nested between outer pinion gears. A first and a second clutch that can be engaged "on the fly" achieve the two-speed functionally of the gearbox assembly. Another gearbox assembly includes an on-demand locking differential with a differential clutch located between differential axle side gears to selectively lock the differential axle side gears together and thereby lock the axle shafts.

19 Claims, 4 Drawing Sheets

TWO-SPEED GEARBOX WITH INTEGRATED DIFFERENTIAL

BACKGROUND OF THE INVENTION

The present invention relates to a two-speed gearbox, and more particularly to a two-speed gearbox having a locking differential for a heavy hybrid electric vehicle.

There is an increasing demand for the use of hybrid electric driven and hybrid electric assisted vehicles. Hybrid electric vehicle typically utilize motor driven axles which are often of a multi-axle configuration in military and specialty vehicles systems.

The electric motors are typically sized to meet both torque and speed requirements which may not be the most effective for the operational requirements of such vehicles. Relatively large electric motors are often utilized to meet the torque requirements which may result in an oversized motor for most operational conditions. Moreover, the relatively large electric motors may be difficult to package in a multi-axle configuration. A lightweight and compact reduction gearbox which allows the usage of relatively smaller electric motors is therefore desirable. Two speeds are particularly desirable for military and specialty vehicles to provide high torque in off road conditions and high speed for movement over roads.

Military and specialty vehicles systems also typically require the added traction provided by a biasing or locking differential. A full time biasing differential may be undesirable in such vehicle since a primary motivation for transition to hybrid electric driven vehicles is improved fuel economy which provides increased range and reduced logistic footprint.

Accordingly, it is desirable to provide a lightweight and compact two-speed reduction gearbox and on-demand biasing differential which may be utilized with a relatively smaller electric motor for incorporation into a multi-axle military and specialty vehicle system.

SUMMARY OF THE INVENTION

The gearbox assembly according to the present invention includes a housing which contains a differential gear set and a two-speed reduction gear set. A differential spider drives differential pinion gears which are nested between outer pinion gears. A first and a second clutch that can be engaged "on the fly" achieve the two-speed functionality of the gearbox assembly. The first clutch is mounted between a case and the housing to selectively lock an input side gear to the case. The second clutch is mounted within the housing to selectively lock an opposite side gear to the housing.

In operation, the input to the gearbox assembly is through the input side gear. To provide a first reduction ratio a piston collapses the first clutch to lock the input side gear to the case. The case is assembled about a differential spider and therefore rotates the differential spider at the same speed as the case and the input side gear to achieve a 1:1 ratio. Engaging the differential pinion gears are the differential axle side gear which drive the axle shaft. Because the differential pinion gears are free to rotate around the differential spider, the differential axle side gear are free to rotate at different speeds creating a differential effect.

To provide a second reduction ratio the second clutch locks the opposite side gear to the housing. With the opposite side gear grounded, the first and second outer pinion gear roll around the opposite side gear rotating the differential spider at half the speed of the input side gear to achieve the second reduction ratio.

Another gearbox assembly includes an on-demand locking differential. The locking differential clutch is located between differential axle side gears to selectively lock the differential axle side gears and thereby lock the axle shafts together.

The present invention therefore provides a lightweight and compact two-speed reduction gearbox and on-demand biasing differential which may be utilized with a relatively smaller electric motor for incorporation into a multi-axle military and specialty vehicle system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
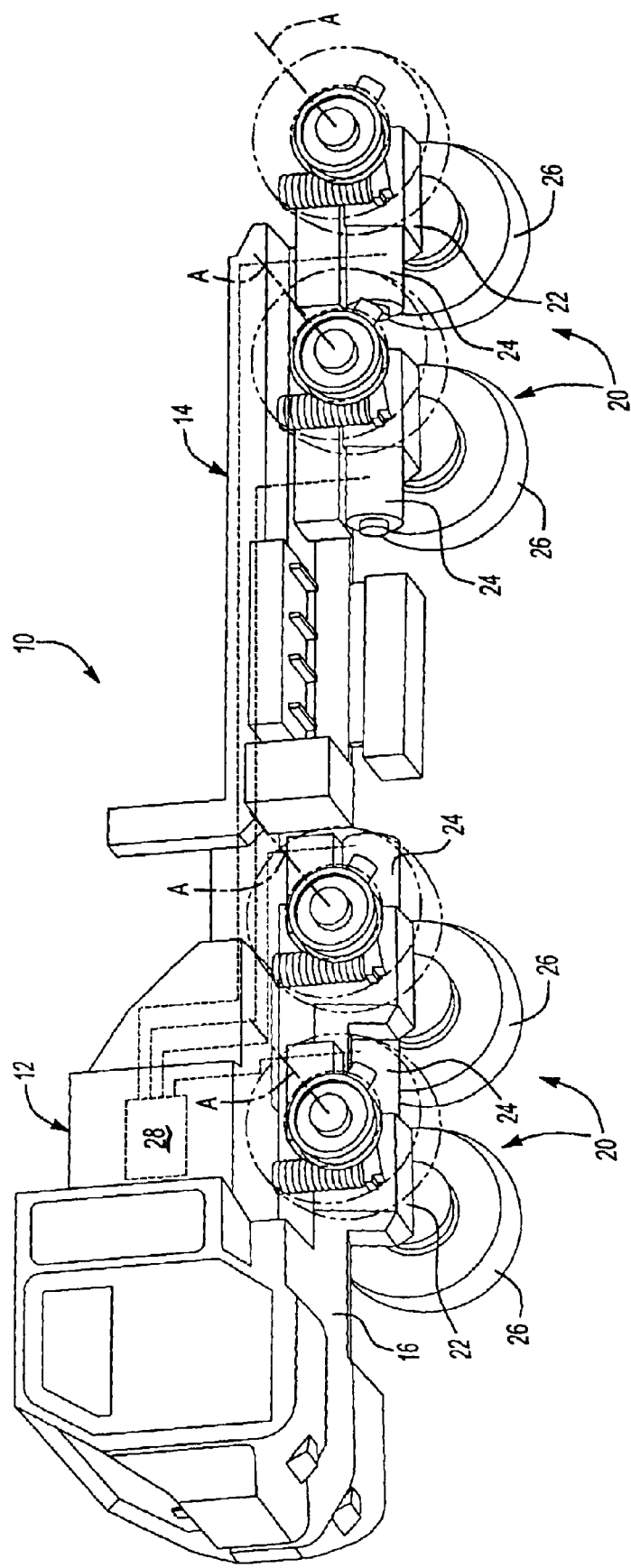
FIG. 1 is a general perspective view an exemplary multi-axle vehicle embodiment for use with the present invention.

FIG. 1 illustrates a schematic partial phantom view of a multi-axle vehicle 10 having a body 12 supported upon a frame 14. The frame 14 preferably includes a pair of main longitudinal members 16. It should be understood that although a particular vehicle arrangement is disclosed in the illustrated embodiment, other vehicles will benefit from the present invention.

A multiple of axle assemblies 20 each includes an axle 22 driven by one or more electric motors 24. Each axle assembly 20 defines an axis of rotation A substantially transverse the longitudinal members 16 to drive one or more wheels 26. The electric motors 24 are driven by a prime mover 28 which is preferably a hybrid electric drive which powers each of the axle assemblies 20 by powering the electric motors 24. It should be understood, however, that other prime movers such as diesel engines, gas turbines among others will also benefit from the present invention.

Figure 2:
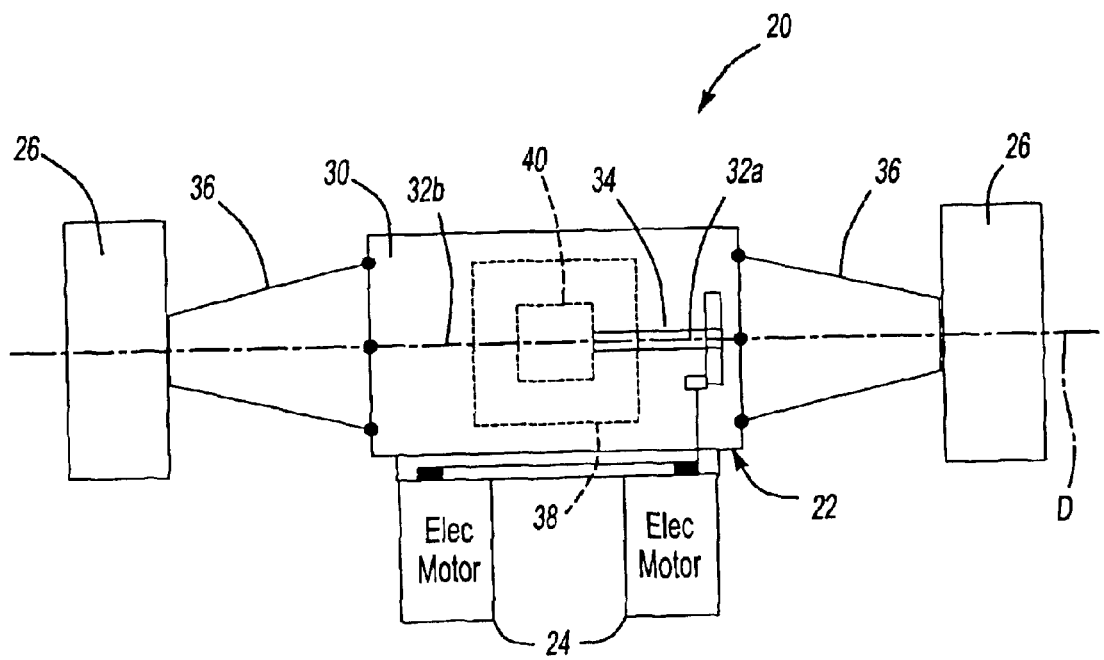
FIG. 2 is a block diagram of an axle assembly of the present invention.

Referring to FIG. 2, the electric motors 24 drive a gearbox assembly 30 which drives the wheels 26 through a first axle shaft 32a and a second axle shaft 32b located along axis D. Preferably, the electric motors 24 drive the gearbox assembly 30 through an input side gear 34 (illustrated schematically) which is coaxial with axis D.

Each wheel 26 is preferably supported by an independent suspension (illustrated schematically at 36). The independent suspensions 36 may be mounted directly to the gearbox assembly 30. Each wheel 26 and supporting suspension 36 moves independently relative to the electric motors 24, gearbox assembly 30 which are mounted to the vehicle frame 14 (FIG. 1). It should be understood that other suspension systems such as a rigid tubular or box axle which contains the gearbox assembly will also benefit from the present invention.

The gearbox assembly 30 is preferably a two-speed reduction gear set 38 that includes a differential gear set 40 substantially contained within the two-speed reduction gear set 38. That is, differential gear set 40 is nested within the two-speed reduction gear set 38. A relatively lightweight and compact gearbox assembly 30 is thereby provided which will benefit from an electric motor of reduced size.

Figure 3:
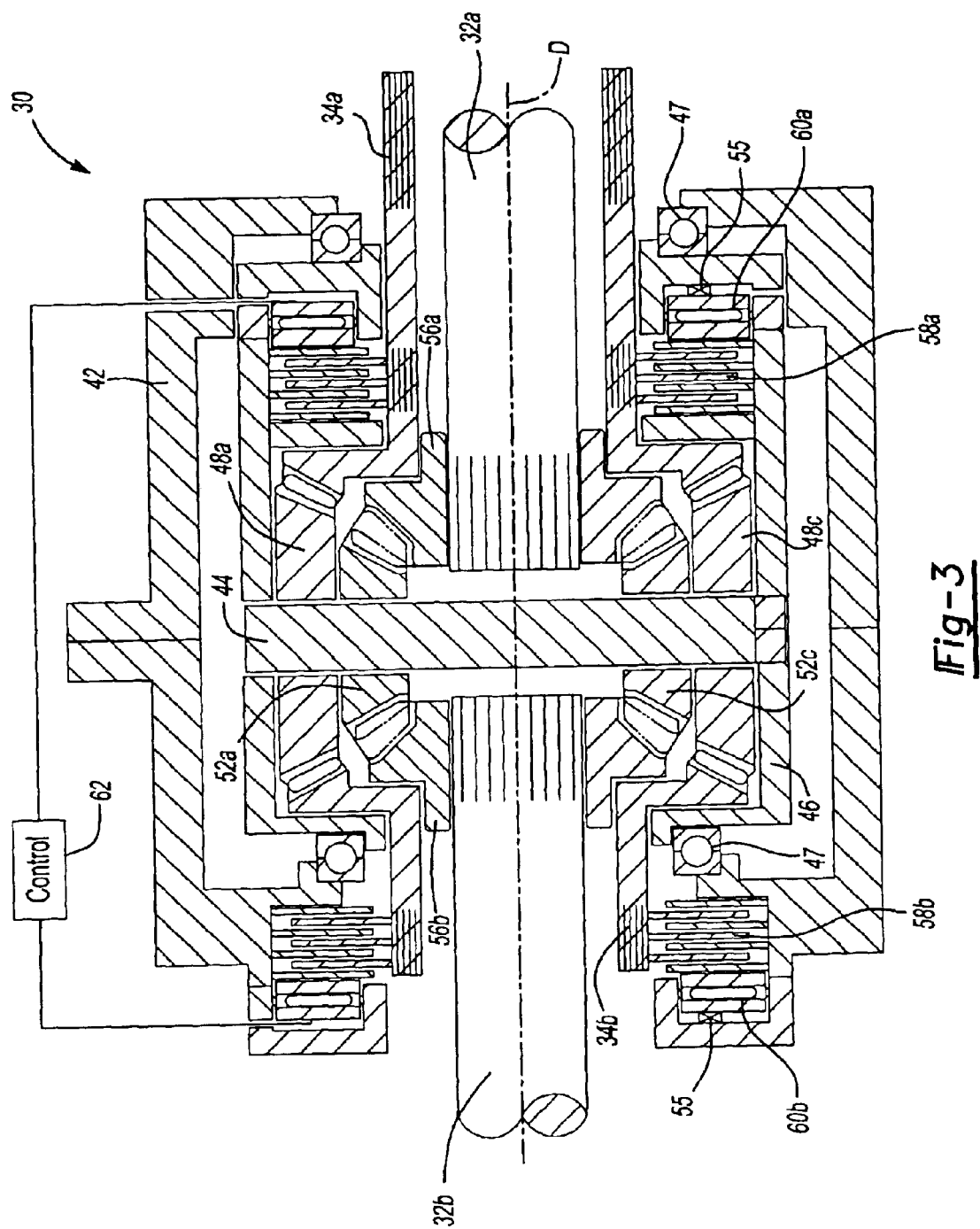
FIG. 3 is a schematic sectional view of a two-speed gearbox.

Referring to FIG. 3, the gearbox assembly 30 is schematically illustrated. The gearbox includes a housing 42 which contains the differential gear set 40 and the two-speed reduction gear set 38. The housing 42 receives the first and second axle shaft 32a, 32b along axis D. The input side gear 34a is coaxial with axis D and is driven by the electric motors 24 (FIG. 2).

Figure 4:
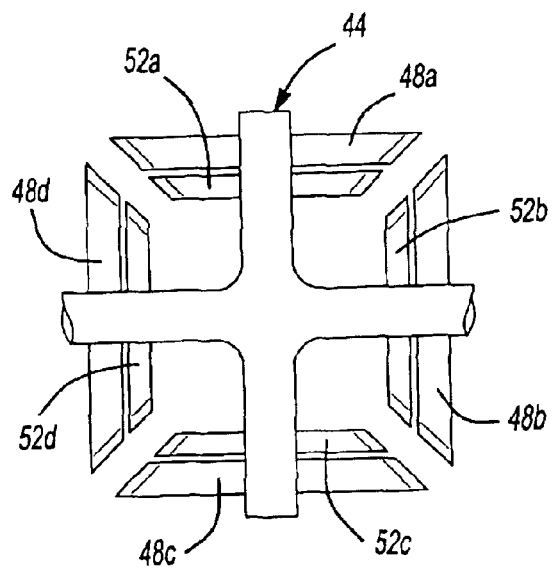
FIG. 4 is a planar view of a differential spider for use in the gear box of FIG. 3.

A differential spider 44 is mounted to a case 46. The case 46 is contained within the housing 42 and rotates about axis D upon bearings 47. The spider 44 is mounted generally transverse to axis D. A multiple of outer pinion gear 48a, 48b, 48c, 48d are mounted for rotation about the differential spider 44 (FIG. 4). A multiple of inner differential pinion gear 52a, 52b, 52c, 52d are mounted for rotation about the differential spider 44 independent of the outer pinion gears 48a–48d. That is, the inner differential pinion gears 52a–52d and the outer pinion gears 48a–48d are mounted for independent rotation on the legs of the differential spider 44. As generally known the spider includes multiple legs (FIG. 4), each of which includes one outer pinion gear 48 and one inner differential pinion gear 52 (FIG. 4) although only two legs are illustrated in the sectional view of FIG. 3. Notably, the differential pinion gears 52a–52d are nested between the outer pinion gears 48a–48d.

The input side gear 34a is engaged with the outer pinion gears 48a–48d. An opposite side gear 34b opposite the input side gear 34a is likewise engaged with the outer pinion gears 48a–48d. It should be understood that although the input side gear 34a is coaxial with axle shaft 32a and the opposite side gear 34 is coaxial with axle shaft 32b in the illustrated embodiment, the opposite or other arrangements will also benefit from the present invention.

A first differential axle side gear 56a is mounted to the first axle shaft 32a and a second differential axle side gear 56b is mounted to the second axle shaft 32b. The first and second differential axle side gears 56a, 56b engage the inner differential pinion gears 52a–52d.

A first and a second clutch 58a, 58b that can be engaged "on the fly" achieve the two-speed functionality of the gearbox assembly 30. The first clutch 58a is mounted between the case 46 and the housing 32 and is actuated by a first piston 60a to selectively lock the input side gear 34a to the case 46. The second clutch 58b is mounted within the housing 32 and is actuated by a second piston 60b to selectively lock the opposite side gear 34b to the housing 32. Alternatively, or additionally, the locking effect can achieved by a dog clutch, sliding collar, amongst others. The pistons 60a, 60b are actuated by a pressurized fluid and/or spring in response to a controller 62 (illustrated schematically).

It should be further understood that various bearing and seal locations are included within the gearbox. One of ordinary skill in the art, with the benefit of this disclosure, will consider the various bearing and seal locations to be an ordinary engineering problem such that intricate details thereof need not be fully discussed herein.

In operation, the input to the gearbox assembly 30 is through the input side gear 34a. To provide a first reduction ratio (1:1 ratio), the piston 60a is actuated by controller 32 and the piston 60b is not energized. The piston 60a collapses the clutch pack 58a to lock the input side gear 34a to the case 46. The case 46 is assembled about the differential spider 44 and therefore rotates the differential spider 44 at the same speed as the case 46 and the input side gear 34a to achieve a 1:1 ratio. The differential spider 44 drives the differential pinion gears 52a, 52b which are nested between the first and second outer pinion gear 48a, 48b.

Engaging the differential pinion gears 52a, 52b are the differential axle side gear 56a, 56b which drive the axle shaft 32a, 32b. Because the differential pinion gears 52a, 52b are free to rotate around the differential spider 44, the differential axle side gear 56a, 56b are free to rotate at different speeds creating a differential effect.

To provide a second reduction ratio (2:1 shown, but other ratios are achieved by providing an angled spider as generally understood), the piston 60b is actuated by controller 32 and the piston 60a is not energized. The piston 60b collapses the clutch pack 58b to lock the opposite side gear 34b to the housing 42. With the opposite side gear 34b grounded, the first and second outer pinion gear 48a, 48b roll around the opposite side gear 34b rotating the differential spider 44 at half the speed of the input side gear 34a and achieving the 2:1 reduction. The differential spider 44 drives the differential pinion gears 52a, 52b which rotate the differential axle side gears 56a, 56b and drive the axle shaft 32a, 32b.

Alternatively, the gearbox assembly 30 can be biased toward a single reduction ratio such that that the selected reduction ratio is the usual un-powered ratio provided by the gearbox assembly 30. That is, the gearbox assembly 30 always operated in a single selected reduction ration unless power is applied to overcome the bias and actuate the other reduction ratio. A biasing member (illustrated schematically at 55) such as a spring or the like biases one piston 60a, 60b. Actuation of the one piston 60a, 60b overcomes the biasing member 55 and actuation of the opposite piston 60b, 60a operates as described above to provide the second reduction ratio. Such an arrangement is particularly beneficial when one reduction will be know to be utilized more often than the other.

Figure 5:
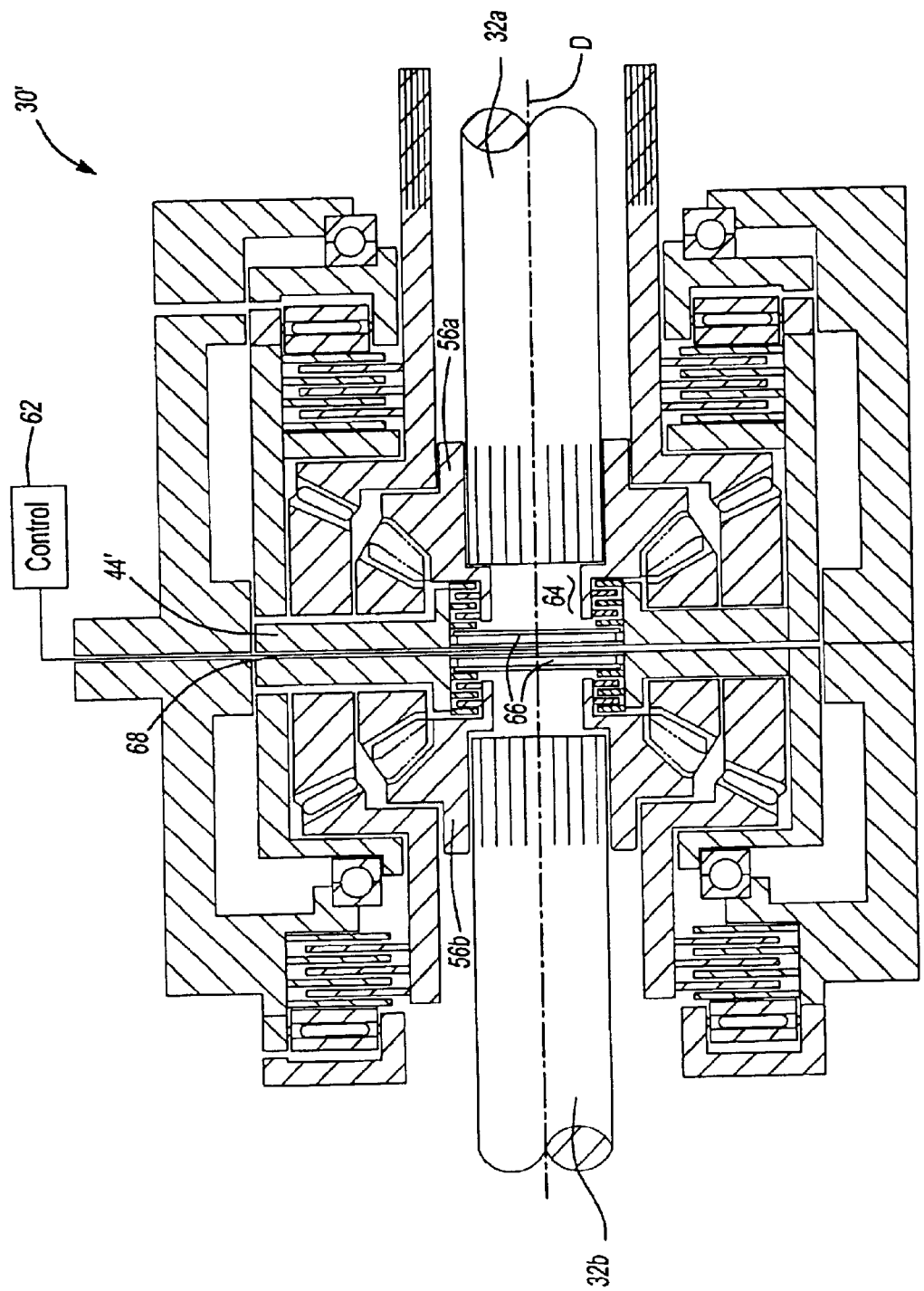
FIG. 5 is a schematic sectional view of another two-speed gearbox with an on-demand locking differential.

Referring to FIG. 5, another gearbox assembly 30' which includes an on-demand locking differential is schematically illustrated. The gearbox assembly 30 generally includes the components of gearbox assembly 30 with a locking differential clutch 64 which is controlled by controller 62. The locking differential clutch 64 is located between the differential axle side gears 56a, 56b to selectively lock the differential axle side gears 56a, 56b together and thereby lock the axle shaft 32a, 32b. The locking differential clutch 64 is collapsed by sealed pistons 66 (illustrated schematically) located between a split differential spider 44'. Pressurized fluid is communicated through apertures 68 located through the length of the legs of the split differential spider 44'. The on-demand functionality is achieved by control logic within the controller 62 which applies pressure to the sealed pistons 66 whenever wheel slip is detected.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A two-speed gearbox assembly comprising:
   a housing;
   a case rotationally mounted within said housing;
   a differential spider mounted to said case, said differential spider comprising a plurality of legs which mount a plurality of inner differential pinion gears and a plurality of outer pinion gears;
   a first clutch mounted between said housing and said case to selectively lock an input side gear to said case to provide a first reduction ratio; and
   a second clutch mounted to said housing to selectively lock an opposite side gear to said housing to provide a second reduction ratio.

2. The two-speed gearbox assembly as recited in claim 1, further comprising:
   a differential spider mounted to said case, said differential spider comprising a plurality of legs which mount a plurality of inner differential pinion gears and a plurality of outer pinion gears;
   a first axle shaft engaged with said inner differential pinion gears, said first axle shaft defined along an axis of rotation; and
   a second axle shaft engaged with each of said differential pinion gears, said second axle shaft defined along said axis of rotation.

3. The two-speed gearbox assembly as recited in claim 2, further comprising:
   a first differential axle side gear mounted to said first axle shaft;
   a second differential axle side gear mounted to said second axle shaft;
   a locking differential clutch mounted between said first and second differential axle side gears to selectively lock said first and second differential axle side gears together.

4. The two-speed gearbox assembly as recited in claim 3, further comprising:
   a split differential spider comprising a plurality of legs in which pressurized fluid is communicated along the length of each of said plurality of legs.

5. The two-speed gearbox assembly as recited in claim 3, further comprising:
   a split differential spider comprising a plurality of legs;
   a plurality of sealed pistons located within said split differential spider such that in response to a pressurized fluid communicated along the length of each of said plurality of legs said plurality of sealed pistons actuate said locking differential clutch to selectively lock said first and second differential axle side gears together.

6. The two-speed gearbox assembly as recited in claim 1, wherein:
   said input side gear coaxially mounted about said axis of rotation and engaged with said outer pinion gears; and
   said opposite side gear coaxially mounted about said axis of rotation and engaged with said outer pinion gears.

7. The two-speed gearbox assembly as recited in claim 1, further comprising:
   a biasing member which maintains said first clutch in an actuated condition.

8. The two-speed gearbox assembly as recited in claim 1, further comprising:
   a biasing member which maintains said second clutch in an actuated condition.

9. A two-speed gearbox assembly comprising:
   a housing;
   a case rotationally mounted within said housing;
   a differential spider mounted to said case, said differential spider comprising a plurality of legs which mount a plurality of inner differential pinion gears and a plurality of outer pinion gears;
   a first axle shaft engaged with said inner differential pinion gears, said first axle shaft defined along an axis of rotation;
   a second axle shaft engaged with each of said differential pinion gears, said second axle shaft defined along said axis of rotation;
   an input side gear coaxially mounted about said axis of rotation and engaged with said outer pinion gears;
   an opposite side gear coaxially mounted about said axis of rotation and engaged with said outer pinion gears;
   a first clutch mounted between said housing and said case to selectively lock said input side gear to said case to provide a first reduction ratio; and
   a second clutch mounted to said housing to selectively lock said opposite side gear to said housing to provide a second reduction ratio.

10. The two-speed gearbox assembly as recited in claim 9, further comprising:
    a biasing member which maintains said first clutch in an actuated condition.

11. The two-speed gearbox assembly as recited in claim 9, further comprising:
    a biasing member which maintains said second clutch in an actuated condition.

12. The two-speed gearbox assembly as recited in claim 9, wherein said differential spider comprises a split differential spider comprising a plurality of legs in which pressurized fluid is communicated along the length of each of said plurality of legs.

13. The two-speed gearbox assembly as recited in claim 12, further comprising:
    a first differential axle side gear mounted to said first axle shaft;
    a second differential axle side gear mounted to said second axle shaft; and
    a locking differential clutch mounted within said split differential clutch to selectively lock said first and second differential axle side gears together.

14. The two-speed gearbox assembly as recited in claim 12, wherein said differential spider comprises a split differential spider a split differential spider comprising a plurality of legs; and
    a plurality of sealed pistons located within said split differential spider such that in response to a pressurized fluid communicated along the length of each of said plurality of legs, said plurality of sealed pistons actuate said locking differential clutch to selectively lock a first and a second differential axle side gears together to lock said first axle shaft to said second axle shaft.

15. The two-speed gearbox assembly as recited in claim 9, further comprising:
    an electric motor which drives said input side gear.

16. A method of selecting between a first and a second reduction ratio comprising the steps of:
    (1) selectively actuating a first clutch mounted between a housing and a case rotationally mounted within the housing to selectively lock an input side gear to the case to provide a first reduction ratio; and (2) selectively actuating a second clutch mounted to the housing to selectively lock an opposite side gear to the housing to provide a second reduction ratio.

17. A method as recited in claim 16, wherein said step (1) further comprising the step of:

selectively actuating a locking differential clutch mounted within a split differential clutch to selectively lock a first and second differential axle side gear together to selectively lock a first and a second axle shaft.

18. A method as recited in claim 16, wherein said step (1) further comprising the step of:

biasing the first clutch to an actuated condition.

19. A method as recited in claim 16, wherein said step (1) further comprising the step of:

biasing the second clutch to an actuated condition.

* * * * *